United States Patent
Peng et al.

(10) Patent No.: US 9,948,905 B2
(45) Date of Patent: Apr. 17, 2018

(54) REMOTE ACCESS CONTROL SYSTEM FOR CONTROLLING DOOR LOCK TO UNLOCK REMOTELY

(71) Applicant: BRAINCHILD ELECTRONIC CO., LTD., Taipei (TW)

(72) Inventors: Tsu-Yi Peng, Taipei (TW); Hee-Lup Chong, Taipei (TW); Susan Dong, Taipei (TW)

(73) Assignee: BRAINCHILD ELECTRONIC CO., LTD., Taipei (TW)

( * ) Notice: Subject to any disclaimer, the term of this patent is extended or adjusted under 35 U.S.C. 154(b) by 205 days.

(21) Appl. No.: 14/925,708

(22) Filed: Oct. 28, 2015

(65) Prior Publication Data
US 2017/0064261 A1 Mar. 2, 2017

(30) Foreign Application Priority Data
Aug. 28, 2015 (TW) .............................. 104128313 A

(51) Int. Cl.
*H04N 7/18* (2006.01)
(52) U.S. Cl.
CPC .................................. *H04N 7/186* (2013.01)
(58) Field of Classification Search
CPC ...................................................... H04N 7/186
USPC ....................................................... 348/156
See application file for complete search history.

(56) References Cited

U.S. PATENT DOCUMENTS

| 8,331,544 B2 | 12/2012 | Kraus et al. | |
|---|---|---|---|
| 8,872,915 B1* | 10/2014 | Scalisi | H04N 7/186 348/140 |
| 2006/0087408 A1* | 4/2006 | Korzeniowski | H04L 67/22 340/286.02 |
| 2010/0283579 A1* | 11/2010 | Kraus | G07C 9/00944 340/5.7 |
| 2015/0363989 A1* | 12/2015 | Scalisi | G07C 9/00904 348/143 |

FOREIGN PATENT DOCUMENTS

| TW | 200910894 A | 3/2009 |
|---|---|---|
| TW | M393761 U | 12/2010 |
| TW | M423882 U | 3/2012 |
| TW | M449319 U | 3/2013 |
| TW | 201350662 A | 12/2013 |
| TW | 201419223 A | 5/2014 |

(Continued)

*Primary Examiner* — Francis G Geroleo
(74) *Attorney, Agent, or Firm* — Chun-Ming Shih; HDLS IPR Services

(57) ABSTRACT

A remote access control system comprising a remote host connected to a mobile device, a proximity sensor doorbell, a door lock device and a gateway device is provided. The proximity sensor doorbell triggers a doorbell signal when sensing a finger of a visitor approaches. The gateway device sends a first notification message to the mobile device via the remote host when recognizing that a captured monitoring video comprises image of the visitor, sends a second notification message to the mobile device via the remote host when receiving the doorbell signal, and controls the door lock device to unlock when receiving an unlocking message from the mobile device. This system facilitates the householder to control the entry remotely and effectively reduces the probability of doorbell failing.

9 Claims, 3 Drawing Sheets

(56) References Cited

FOREIGN PATENT DOCUMENTS

| | | |
|---|---|---|
| TW | 201435377 A | 9/2014 |
| TW | M504297 U | 7/2015 |
| TW | M506184 U | 8/2015 |

* cited by examiner

REMOTE ACCESS CONTROL SYSTEM FOR CONTROLLING DOOR LOCK TO UNLOCK REMOTELY

BACKGROUND OF THE INVENTION

Field of the Invention

The technical field relates to control system and more particularly related to remote access control system.

Description of Related Art

In recent years, with the growing awareness of home security, the access control system has been quite popular, and becomes the standard equipment of house or building. The visitor can notice the householder via pressing the doorbell when arriving at the entry. Then, the householder can real-time check the visitor located outside via the access control system, and control the door to open after checking that the visitor is harmless.

However, when using the access control system of the related art, the householder can only perform the control when he is inside of the house, once the householder leaves the house, the householder will be unable to control the access control system. Besides, the householder will be unable to open the door when forgetting to bring the key or access control card.

Besides, because all the doorbells of the related art are triggered by pressing its electronic button, when the electronic button is pressed frequently or pressed with an excessive force, the doorbells would fail and be unable to trigger.

Therefore, the access control system of the related art suffers above-mentioned problems, there is a need to find out a better and more effective solution to handle such problems.

SUMMARY OF THE INVENTION

The object of the present disclosed example is to provide a remote access control system supporting remote control and using a contactless doorbell.

In order to achieve the above objective, a remote access control system is provided which comprises a remote host connected to a mobile device via Internet, a proximity sensor doorbell triggering a doorbell signal when sensing a visitor approaches, a door lock device, and a gateway device connected to proximity sensor doorbell. The gateway device comprises a camera unit capturing a monitoring video, a network unit connected to Internet, a first wireless unit wirelessly connected to the door lock device, and a first control unit electrically connected to the camera unit, the network unit and the first wireless unit. The first control unit sends a first notification message to the mobile device via the remote host when recognizing that the captured monitoring video comprises image of the visitor, sends a second notification message to the mobile device via the remote host when receiving the doorbell signal, and controls the door lock device to unlock when receiving an unlocking message from the mobile device.

The present disclosed example facilitates the householder to control the entry remotely and effectively reduces the probability of doorbell failing.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present invention.

Figure 1:
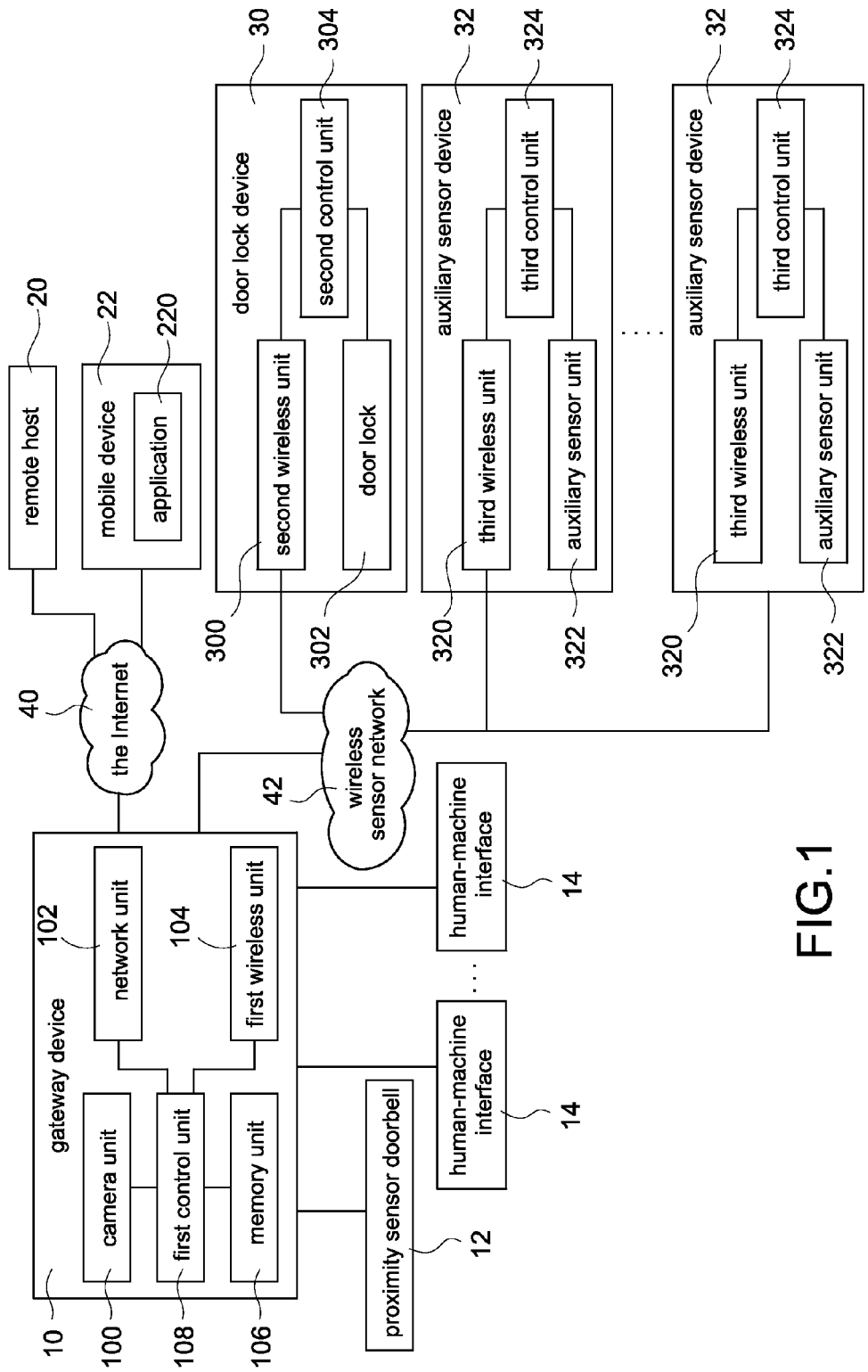
FIG. 1 is an architecture diagram of a remote access control system according to an embodiment of the present disclosed example.

First, please refer to FIG. 1, which illustrates an architecture diagram of a remote access control system according to an embodiment of the present disclosed example. As shown in FIG. 1, the remote access control system of this embodiment mainly comprises a gateway device 10, a proximity sensor doorbell 12, a remote host 20 and a door lock device 30, wherein the gateway device 10 and the remote host 20 are connected to the Internet for communication and connected to a mobile device 22 held by a householder via the Internet.

As a relay host between the gateway device 10 and the mobile device 22, the remote host 20 can respectively establish the connections with the gateway device 10 and the mobile device 20. More specifically, the mobile device 22 can establish the connection with the remote host 20 for communication (such as logging in a user account, sending an unlocking message or sending the configuring parameters of the gateway device 10) after executing an application 220, the remote host 20 can forward the data received from the gateway device 10 to the mobile device 22, or forward the data received from the mobile device 22 to the gateway device 10. For example, the remote host 20 can receive the monitoring video or a monitoring voice from the gateway device 10 and forward it to the mobile device 22, simultaneously receive a returning video or a returning voice from the mobile device 22 and forward it to the gateway device 10. Thus, the mobile device 22 can perform the real-time video/voice streaming transmission with the gateway device 10 via the remote host 20 as directly establishing a connection with the gateway device 10, and lead the householder located at far-end to execute a real-time video/voice communication with the visitor located at the entry of the house. Preferably, the remote host 20 is mapped to a fixed IP address or a permalink.

Please be noted that most of the devices installed in the house and the mobile devices are connected to the Internet 40 via the different dynamic IP addresses currently. If the gateway device 10 and the mobile device 22 are unable to retrieve the current IP address each other, they are unable to directly establish the connection. Via making the connectable remote host 20 as the relay host, the present disclosed example can lead the gateway device 10 and the mobile device 22 to communicate each other under the status that the gateway device 10 and the mobile device 22 don't know the current IP address each other.

Although the gateway device 10 indirectly communicates with the mobile device 22 via the remote host 20 in this embodiment, this specific example is not intended to limit the scope of the present disclosed example. In another embodiment of the present disclosed example, the gateway device 10 can periodically/irregularly upload its current IP address to the remote host 20. When the mobile device 22 wants to establish the connection with the gateway device 10, the mobile device 22 can first connect to the remote host 20 for retrieving the current IP address of the gateway device 10, then directly establish a P2P connection with the gateway device 10 according to the retrieved IP address, and vice versa.

The gateway device 10 comprises a camera unit 100, a network unit 102, a first wireless unit 104, a memory unit 106 for storing data and a first control unit 108 connected to above-mentioned elements and used to controlling the gateway device 10. Preferably, the first control unit 108 is electrically connected to above-mentioned other elements via the internal wiring, and installed in the same case with above-mentioned other elements together.

The camera unit 100 is used to capture the monitoring video. Preferably, the gateway device 10 is installed at the entry of the house for making the camera unit 100 capture the monitoring video of the entry, but this specific example is not intended to limit the scope of the present disclosed example. In another embodiment of the present disclosed example, the camera unit 100 is installed outside of the body of gateway device 10 (for example, the camera unit 100 is installed at the entry of the house, and the body of the gateway device 10 is installed inside of the house), and wired/wirelessly connected to the first control unit 100 (such as connecting via the data transmission cable or the wireless sensor network 42). Thus, the present disclosed example can prevent the body of the gateway device 10 from being destroyed or stolen.

The network unit 102 is used to connect the Internet 40. Preferably, the network unit 102 can establish the connection and communicate with the remote host 20 or the mobile device 22 via the Internet 40.

The first wireless unit 104 is wirelessly connected to the door lock device 30 and forms the wireless sensor network 42. Preferably, the first wireless unit 104 is a gateway module, and can establish the connection with a plurality of external wireless devices (such as the door lock device 30 or an auxiliary sensor device 32) and form the wireless sensor network 42 for transferring signal or data. Preferably, the first wireless unit 104 is a Bluetooth wireless transceiver, a Wi-Fi wireless transceiver or a ZigBee wireless transceiver, but this specific example is not intended to limit the scope of the present disclosed example. Additionally, if the camera unit 100 is installed outside of the body of the gateway device 10, the first wireless unit 104 can wirelessly connect to the camera unit 100 and form the wireless sensor network 42.

The first control unit 108 can execute an object-recognizing process to the monitoring video retrieved from the camera unit 100, and send a notification message (namely the first notification message) to the remote host 20 via the network unit 102 for making the remote host 20 forward the notification message to the mobile device 22 when recognizing that the monitoring video comprises the image of the visitor. Preferably, above-mentioned object-recognizing process is a stay-recognizing process (such as determining whether the time of the object illustrated in the monitoring video staying in the screen exceeds a predetermined time), a gesture-recognizing process or a facet-recognizing process, but this specific example is not intended to limit the scope of the present disclosed example.

Besides, the first control unit 108 can send another notification message (namely the second notification message) to the mobile device 22 via the remote host 20 (such as indirectly sending via the remote host 20 forwarding or directly sending via the P2P connection between the gateway device 10 and the mobile device 22) when receiving the doorbell signal from the proximity sensor doorbell 12. Besides, the first control unit 108 can control the door lock device 30 to unlock/lock when receiving an unlocking/locking message from the mobile device 22. Preferably, the first control unit 108 sends an unlocking/locking signal to the door lock device 30 for performing above-mentioned control via the first wireless unit 104.

The proximity sensor doorbell 12 is wired/wirelessly connected to the gateway device 10 (such as externally connecting to the gateway device 10 via the data transmission cable or the wireless sensor network 42) and installed at the entry of house for replacing the traditional doorbell. More specifically, the proximity sensor doorbell 12 comprises a proximity sensor. The proximity sensor doorbell 12 can trigger and transfer the doorbell signal to the gateway device 10 when sensing that a finger of the visitor approaches a sensing zone of the proximity sensor. Preferably, the proximity sensor is a sensor suitable for short distance sensing, such as optical reflection type of short distance sensor. Thus, the visitor only needs to move the visitor's finger to approach the sensing zone of the proximity sensor to trigger the doorbell with a contactless way without pressing the proximity sensor doorbell 12.

Preferably, the proximity sensor doorbell 12 can further comprise a buzzer, and simultaneously control the buzzer to sound for tipping the visitor that the doorbell has been triggered when the doorbell signal is triggered.

The present disclosed example can prevent that doorbell is destroyed by excessively pressing, and further reduce the probability of doorbell failing via providing the contactless way to trigger the doorbell. Besides, the present disclosed example can reduce the probability of the gateway device 10 being destroyed or stolen via separately installing the gateway device 10 having a higher cost and the proximity sensor doorbell 12 having a lower cost at different locations (such as installing the proximity sensor doorbell 12 beside the door, and installing the gateway device 10 at the location with difficulty to destroy the gateway device 10, such as the inside of the door or ceiling).

Please be noted that although the proximity sensor doorbell 12 and the gateway device 10 are separately installed in this embodiment, but this specific example is not intended to limit the scope of the present disclosed example. In another embodiment of the present disclosed example, the proximity sensor doorbell 12 and the gateway device 10 are installed in the same case, and connect to the first control unit 108 of the gateway device 10 via the internal wiring. Thus, the present disclosed example can dispense the householder from installing additional proximity sensor doorbell 12, and provide the better convenience of installation.

The door lock device 30 is installed in the door and connected to the gateway device 10 via the wireless sensor network 42 for accepting the control. More specifically, the door lock device 30 comprises a second wireless unit 300 used to connect to the wireless sensor network 42, a door lock 302, and a second control unit 304 electrically connected to above-mentioned elements. The second control unit 304 can control the door lock 302 to unlock/lock according to the unlocking/locking signal received from the gateway device 10 via the second wireless unit 300. Furthermore, the door lock device 30 can return an unlocked/locked message to the mobile device 22 via the gateway device 10 (and the remote host 20) after completing the unlocking operation. Preferably, the second wireless unit 300 is a Bluetooth wireless transceiver, a Wi-Fi wireless transceiver or a ZigBee wireless transceiver, but this specific example is not intended to limit the scope of the present disclosed example.

Preferably, the door lock device 30 further comprises a keyhole structure or an electronic key reading unit (not illustrated in figure) for leading the householder to unlock/lock the door lock 302 via a physical key or an electronic key (e.g. access control card or biological characteristic (such as fingerprint, palm vein, or iris)).

Thus, the householder can use the mobile device 22 to remotely execute the access control to house from fat-end via the remote host 20 and gateway device 10.

Although the mobile device 22 is connected to the gateway device 10 via the Internet 40 and the remote host 20 for executing the remote access control to the house from far-end in above-mentioned embodiment, but this specific example is not intended to limit the scope of the present disclosed example. In another embodiment of the present disclosed example, the mobile device 22 can also directly connect to the gateway device 10 via the wireless sensor network 42 for executing the access control to the house (such as retrieving the monitoring video, sending the unlocking/locking message) from near-end.

In another embodiment of the present disclosed example, the remote access control system further comprises at least one auxiliary sensor device 32. The auxiliary sensor device 32 comprises a third wireless unit used to connect the gateway device 10 via the wireless sensor network 42, an auxiliary sensor unit 322 and a third control unit 324 electrically connected to above-mentioned elements. The third control unit 324 can send a trigger signal to the gateway device 10 via the third wireless unit 320 when sensing the visitor via the auxiliary sensor unit 322. Preferably, the auxiliary sensor unit 322 is a static electrostatic sensor (e.g. static electrostatic sensing carpet), a pressure sensor (e.g. pressure sensing floor tile), a thermal camera, a motion sensor (e.g. PIR sensors) or any combination of the above-mentioned sensor, the third wireless unit 320 is a Bluetooth wireless transceiver, a Wi-Fi wireless transceiver or a ZigBee wireless transceiver, but this specific example is not intended to limit the scope of the present disclosed example.

Besides, in this embodiment, the gateway device 10 sends the notification message to the mobile device 22 when recognizing that the monitoring video comprises the image of the visitor and simultaneously receiving the trigger signal. Or, the gateway device 10 sends the notification message to the mobile device 22 when simultaneously receiving the doorbell signal and the trigger signal. The present disclosed example can effectively reduce the probability of misjudgment via using the auxiliary sensor device 32 to assist the execution of the visitor-detection.

In another embodiment of the present disclosed example, the gateway device 10 is to send the notification message to the mobile device 22 when recognizing that the monitoring video comprises the image of visitor, receiving the doorbell signal or receiving the trigger signal.

In another embodiment of the present disclosed example, the remote access control system further comprises at least one human-machine interface 14 used to accept operation or output message. The human-machine interface 14 can wired or wirelessly connect to the gateway device 10 (such as externally connecting to the gateway device 10 via the data transmission cable or the wireless sensor network 42), or be installed in the same case with the gateway device 10 and connect to the first control unit 108 of the gateway device 10 via the internal wiring. Preferably, the human-machine interface 14 is an interphone, a microphone, an unlocking button, a keyboard, a speaker, a touchscreen, a displayer or any combination of above-mentioned device, but this specific example is not intended to limit the scope of the present disclosed example.

Besides, when the human-machine interface 14 is the combination of the interphone and displayer, the gateway device 10 can upload the monitoring voice retrieved by the interphone to the remote host 20 or the mobile device 22, and transfer the returning voice or the returning video downloaded from the remote host 20 or the mobile device 22 to the human-machine interface 14 for playing.

In another embodiment of the present disclosed example, the human-machine interface 14 is the unlocking button, and sends the unlocking message to the gateway device 10 such that the gateway device 10 controls the door lock device 30 to unlock when being triggered by the householder.

In another embodiment of the present disclosed example, the human-machine interface 14 is the microphone, the gateway device 10 can send the notification message (namely the third notification message) to the mobile device 22 via the remote host 20 when receiving the monitoring voice of the visitor via the human-machine interface 14.

Figure 2A:
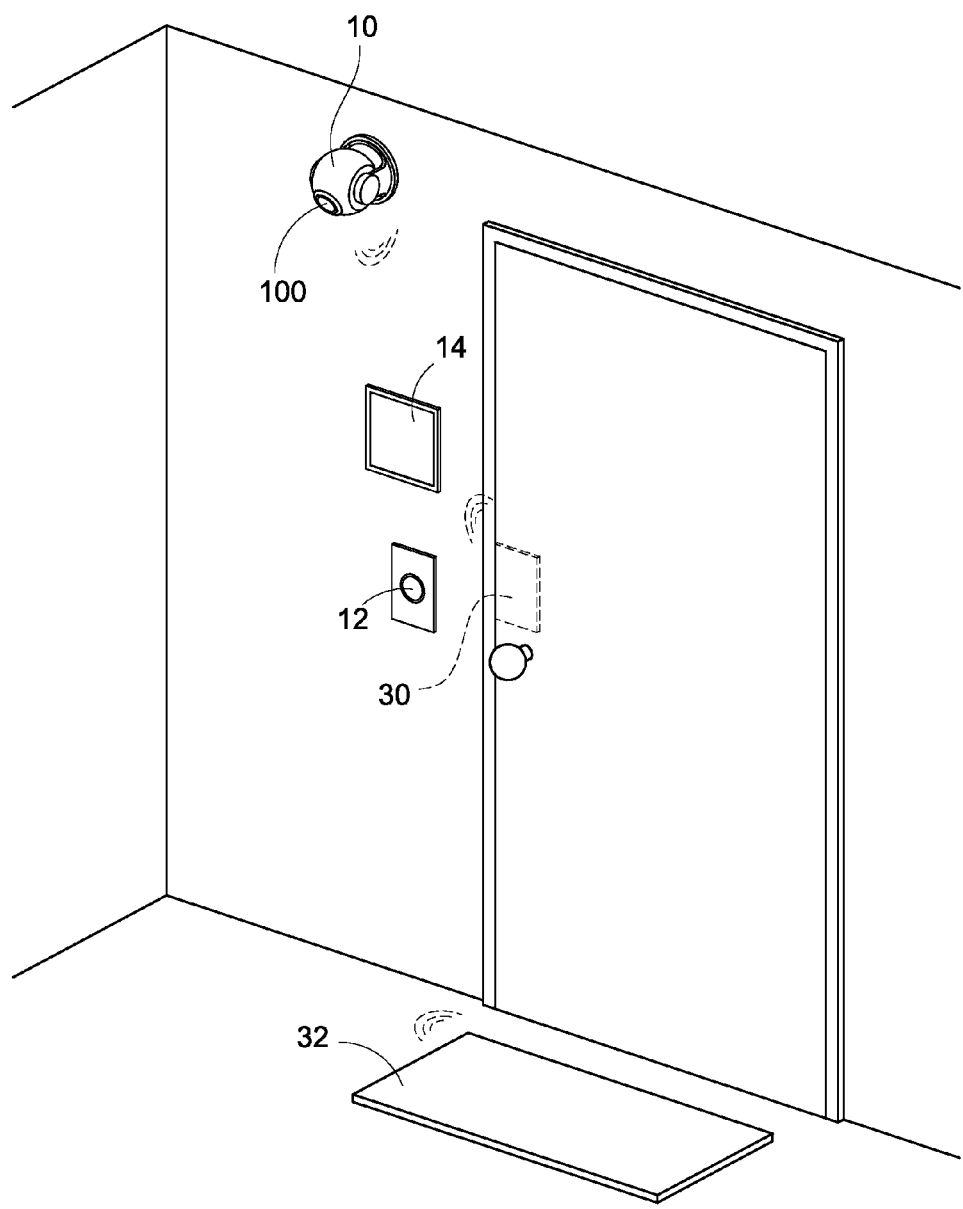
FIG. 2A is a usage schematic view of a remote access control system according to an embodiment of the present disclosed example.

Please refer to FIG. 2A, which illustrates a usage schematic view of a remote access control system according to an embodiment of the present disclosed example, and is used to explain an installation way of the remote access control system of the present disclosed example. In this embodiment, the gateway device 10 is installed at the heights of the entry to prevent it from destruction, and the lens of the camera unit 100 is installed towards the zone at which the door is located for monitoring. The door lock device 30 is installed inside of the door. The proximity sensor doorbell 12 and the human-machine interface 14 (take interphone for example in this embodiment) are installed beside the door with a suitable height for making the visitor convenient to use. The auxiliary sensor device 32 is the static electrostatic sensing carpet paved in front of the door, and can send the trigger signal to the gateway device 10 when sensing that the visitor embarks on the static electrostatic sensing carpet.

Figure 2B:
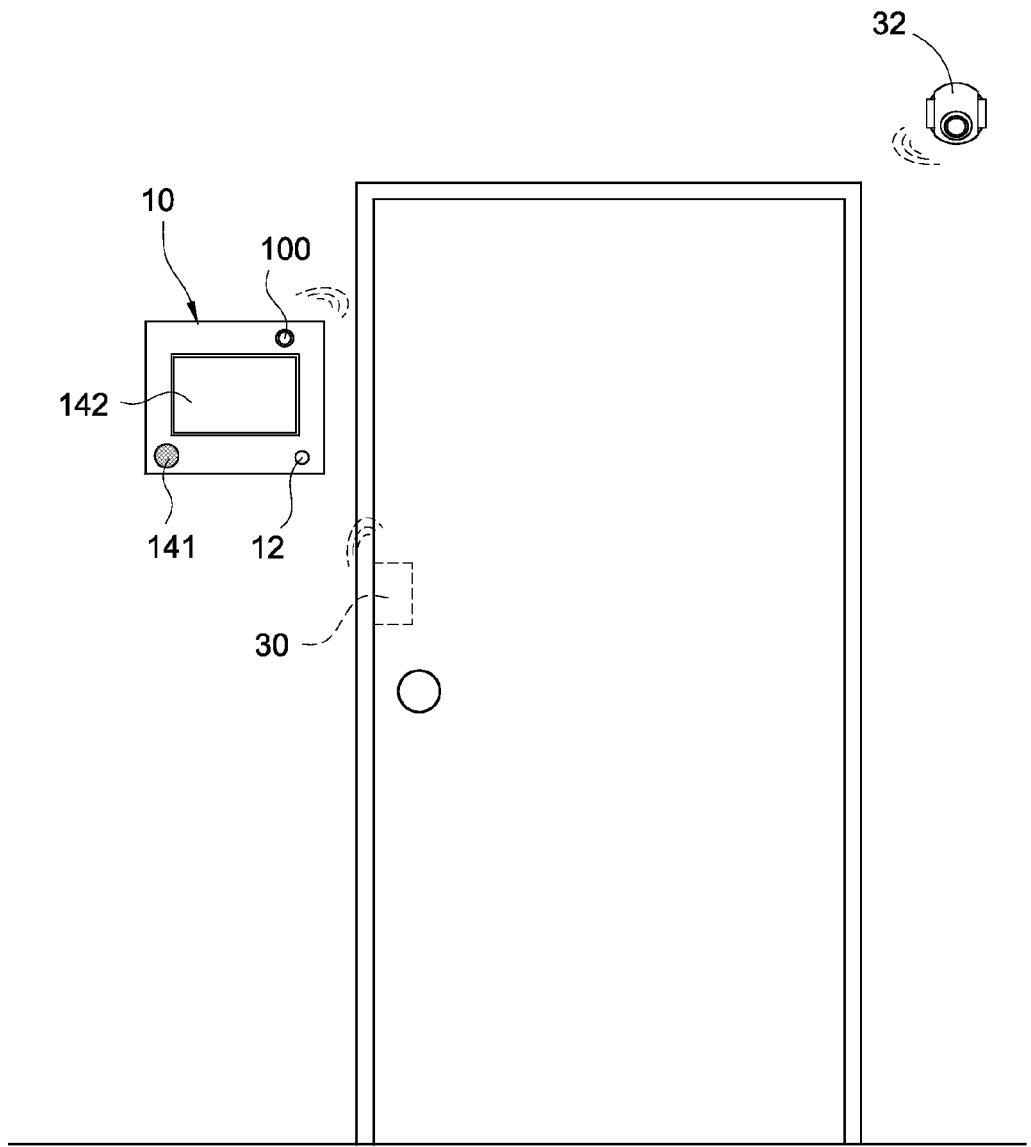
FIG. 2B is a usage schematic view of a remote access control system according to another embodiment of the present disclosed example.

Please refer to FIG. 2B, which illustrates a usage schematic view of a remote access control system according to another embodiment of the present disclosed example, and is used to explain an installation way of the remote access control system of the present disclosed example. In this embodiment, the door lock device 30 is installed inside of the door. The human-machine interface 14 is the combination of the interphone 141 and the displayer 142. The proximity sensor doorbell 12, the interphone 141, the displayer 142 and the gateway device 10 are installed in the same case, and the case is installed beside the door with a suitable height for making the visitor convenient to use. Additionally, the lens of the camera unit 100 is installed towards the zone at which the door is located for monitoring. The auxiliary sensor device 32 is the thermal camera, and can capture the thermal image of the entry and send the trigger signal to the gateway device 10 when detecting the heat source of the visitor.

Please refer to FIG. 1, in another embodiment of the present disclosed example, the remote host 20 can further provide a message-recording and message-sifting function. More specifically, the remote host 20 can record the messages (e.g. notification message or unlocking/locking message) received from the gateway device 10 or the mobile device 22, and automatically sift the repeated messages received from the same device in the same threshold time interval (e.g. 10 seconds). For example, if the remote host 20 continuously received three notification messages from the gateway device 10 in 10 seconds, the remote host 20 only forwards the first notification message to the mobile device 22, and sifts the second message and the third message out. Thus, the present disclosed example can prevent the householder from bothering because repeatedly notifying the same visitor, or meaningless data transmission or system crash because repeatedly sending the same message of the control operation (such as unlocking).

In another embodiment of the present disclosed example, the remote host 20 can further provide a reception-checking function. More specifically, the remote host 20 can check whether the gateway device 10 or the mobile device 22 has received the message forwarded by the remote host 20. Preferably, the remote host 20 can attach a receipt to the message or transfer the message via a TCP connection, and determine whether the gateway device 10 or the mobile device 22 is successful to receive the message according to whether the remote host 20 has received the receipt or the acknowledgement (ACK) packet from the gateway device 10 or the mobile device 22.

In another embodiment of the present disclosed example, the remote host 20 can further provide a message-broadcasting function. In this embodiment, the remote host 20 is to simultaneously connect a plurality of the mobile devices 22 (above-mentioned mobile devices 22 can be respectively hold by the different householders), wherein each mobile device has been verified (such as successfully logging in the user account). The remote host 20 can simultaneously forward the received message to all verified mobile device 22 when receiving the notification message (e.g. first notification message, second notification message or third notification message) from the gateway device 10. Thus, all the householders of the house can simultaneously receive the notification message, and assign one householder who is currently free or nearest to the house to process the event corresponding to this notification message.

In another embodiment of the present disclosed example, the present disclosed example further provided a recognition mechanism used in the wireless sensor network 42. In this embodiment, each external wireless device (e.g. door lock device 30, auxiliary sensor device 32, externally connected proximity sensor doorbell 12 or externally wirelessly connected human-machine interface 14) can dynamically generate an identifying data and transfer the generated identifying data to the remote host 20 via the gateway device 10 when first time establishing the connection with the gateway device 10. Then, the remote host 20 can make the identifying data of all the external wireless device connected to the gateway device 10 correspond to the user account of the householder, store above-mentioned data as a register identifying data and complete the registration procedure.

After that, the gateway device 10 could receive the register identifying data corresponding to the user account of the householder from the remote host 20 and store it in the memory unit 106. When wanting to send the signal or message to specific external wireless device (such as sending the unlocking/locking signal to the door lock device 30), the gateway device 10 simultaneously attach the register identifying data corresponding the specific external wireless device to the signal or message which the gateway device 10 wants to send to for making the receiving device have the ability to verify the source device. The external wireless device verifies whether the received register identifying data is correct (such as both register identifying data and identifying data being consistent) for determining whether the currently received signal or message came from the gateway device 10 according to the identifying data previously dynamically generated when receiving above-mentioned signal or message attached the register identifying data. If the received signal or message doesn't pass the verification, the external wireless device will not operate according to the received signal or message, and further issue a warning message or disconnect the connection. If passing the verification, the external wireless device will operate according to the received signal or message (such as unlocking).

Furthermore, when wanting to send the signal or message to the gateway device 10 (such as the proximity sensor doorbell sending the doorbell signal, the human-machine interface 14 (taking the interphone for example) sending the monitoring voice, the door lock device 30 returning the unlocked/locked message, the auxiliary sensor device 32 sending the trigger signal), each registered external wireless device can also simultaneously attach the identifying data to the signal or message which wants to send for making the receiving device have the ability to recognize the source device. The gateway device 10 can verifies whether the received identifying data is correct according to the register identifying data (such as both register identifying data and identifying data being consistent) when receiving the above-mentioned signal or message attached the identifying data. If the received signal or message doesn't pass the verification, the gateway device 10 will not execute the corresponded control according to the received signal or message, and further issue a warning message to the mobile device 22. If passing the verification, the gateway device 10 will execute the corresponded control according to the received signal or message.

The present disclosed example can effectively bind the gateway device 10 and the registered external wireless device(s) and enhance the network security via providing the recognition mechanism used in the wireless sensor network 42. Moreover, compare with using the fixed identifying data (e.g. device ID or MAC address) which is easy to fake, via using the dynamic identifying data, the present disclosed example can effectively reduce the probability of the malicious people hacking and destroying the remote access control sensor system via faking the identifying data.

As the skilled person will appreciate, various changes and modifications can be made to the described embodiment. It is intended to include all such variations, modifications and equivalents which fall within the scope of the present disclosed example, as defined in the accompanying claims.

What is claimed is:
1. A remote access control system, comprising:
a remote host connected to a mobile device via Internet;
a proximity sensor doorbell, comprising:
 a proximity sensor comprising a sensing zone, the proximity sensor triggering a doorbell signal when sensing that a visitor's finger approaches the sensing zone; and
 a buzzer, sounding when the doorbell signal is triggered;
a door lock device; and a gateway device connected to the proximity sensor doorbell, the gateway device comprising:
a camera unit capturing a monitoring video;
a network unit connected to Internet;
a first wireless unit wirelessly connected to the door lock device; and
a first control unit electrically connected to the camera unit, the network unit and the first wireless unit, the first control unit determining whether the monitoring video comprises image of a visitor, and counting a stay time which the image of the visitor is illustrated in the monitoring video when the monitoring video comprises the image of the visitor, the first control unit sending a first notification message to the mobile device via the remote host when the stay time exceeds a predetermined time, the first control unit sending a second notification message to the mobile device via the remote host when receiving the doorbell signal, and controlling the door lock device to unlock when receiving an unlocking message from the mobile device,
wherein the remote access control system further comprises an auxiliary sensor device connected to the gateway device via a wireless sensor network, the auxiliary sensor device sends a trigger signal to the gateway device when detecting the visitor, wherein the gateway device sends the first notification message to the mobile device when the stay time exceeds the predetermined time and the gateway device receives the trigger signal, and the gateway device sends the second notification message to the mobile device when receiving the doorbell signal and the trigger signal.

2. The remote access control system according to claim 1, wherein the gateway device retrieves a register identifying data corresponding to a user account from the remote host, and simultaneously sends an unlocking signal and the register identifying data to the door lock device when receiving the unlocking message, the door lock device unlocks according to the unlocking signal when verifying that the register identifying data is correct according to an identifying data of the door lock device.

3. The remote access control system according to claim 2, wherein the door lock device dynamically generates and sends the identifying data to the remote host when first time connecting to the gateway device, the remote host makes the identifying data correspond to the user account as the register identifying data.

4. The remote access control system according to claim 1, wherein the remote access control system further comprises a human-machine interface connected to the gateway device and used to accept operation or output message.

5. The remote access control system according to claim 4, wherein the human-machine interface is an unlocking button, and sends the unlocking message to the gateway device for leading the gateway device to control the door lock device to unlock when being pressed.

6. The remote access control system according to claim 4, wherein the human-machine interface is an interphone, the gateway device sends a third notification message to the mobile device via the remote host when receiving a monitoring voice via the human-machine interface.

7. The remote access control system according to claim 4, wherein the human-machine interface is a combination of an interphone used to receive a monitoring voice and a displayer, the gateway device uploads the monitoring video and the monitoring voice to the remote host, and downloads a returning voice or a returning video and transfers the returning voice or the returning video to the human-machine interface for playing, wherein the remote host allows the mobile device downloading the monitoring video and the monitoring voice, and uploading the returning voice and the returning video after the mobile device passed a verification.

8. The remote access control system according to claim 1, wherein the remote host records the first notification message, the second notification message or the unlocking message sent from the gateway device, and sifts the first notification message, the notification message or the unlocking message repeatedly received in the same threshold time interval.

9. The remote access control system according to claim 1, wherein the remote host is to connect to the plurality of the mobile devices via the Internet, and forwards the received message to the plurality of the mobile devices when receiving the first notification message or the second notification message.

* * * * *